(12) United States Patent
Ando et al.

(10) Patent No.: US 10,562,266 B2
(45) Date of Patent: Feb. 18, 2020

(54) ADHESIVE, LAMINATE, CELL CASE PACKAGING, CELL, HIGH-ALKALI SOLUTION PACKAGING, ALCOHOL-CONTAINING SOLUTION PACKAGING, AND PACKAGE

(71) Applicant: MITSUI CHEMICALS, INC., Tokyo (JP)

(72) Inventors: Kazuhiro Ando, Chiba (JP); Yoshihito Hirota, Chiba (JP); Akihiro Imai, Chiba (JP); Yuichi Ito, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 357 days.

(21) Appl. No.: 14/766,014

(22) PCT Filed: Feb. 6, 2014

(86) PCT No.: PCT/JP2014/052750
§ 371 (c)(1),
(2) Date: Aug. 5, 2015

(87) PCT Pub. No.: WO2014/123183
PCT Pub. Date: Aug. 14, 2014

(65) Prior Publication Data
US 2015/0367601 A1 Dec. 24, 2015

(30) Foreign Application Priority Data

Feb. 7, 2013 (JP) .................. 2013-022732

(51) Int. Cl.
*H01M 2/02* (2006.01)
*B32B 7/12* (2006.01)
(Continued)

(52) U.S. Cl.
CPC ............... *B32B 7/12* (2013.01); *B32B 27/08* (2013.01); *B32B 27/32* (2013.01); *B32B 27/40* (2013.01);
(Continued)

(58) Field of Classification Search
None
See application file for complete search history.

(56) References Cited

U.S. PATENT DOCUMENTS 5,536,788 A   7/1996  Isbarn
6,048,639 A * 4/2000  Sonozaki ............. H01M 2/021
                                                          429/127

(Continued)

FOREIGN PATENT DOCUMENTS

EP    0632077 A2    1/1995
JP    7138551 A2    5/1995
(Continued)

OTHER PUBLICATIONS

International Search Report dated May 20, 2014 filed in PCT/JP2014/052750.

*Primary Examiner* — Jeremiah R Smith
(74) *Attorney, Agent, or Firm* — Rankin, Hill & Clark LLP (57) ABSTRACT

An adhesive includes a modified olefin polymer (A) allowing a polymer of a C2 to C20 α-olefin having a structural unit derived from a C4 to C20 α-olefin to be modified with a monomer having a functional group capable of reacting with an isocyanate group and having a heat of fusion measured in accordance with JIS K7122 of 0 J/g or more and 50 J/g or less and a polyisocyanate (B).

16 Claims, 2 Drawing Sheets

(51) Int. Cl.

| | |
|---|---|
| *B32B 27/08* | (2006.01) |
| *B32B 27/32* | (2006.01) |
| *C09J 123/26* | (2006.01) |
| *B32B 27/40* | (2006.01) |
| *B65D 65/14* | (2006.01) |
| *B65D 65/40* | (2006.01) |
| *B65D 81/22* | (2006.01) |
| *C08K 5/01* | (2006.01) |
| *H01M 10/0525* | (2010.01) |

(52) U.S. Cl.
CPC ............ *B65D 65/14* (2013.01); *B65D 65/40* (2013.01); *B65D 81/22* (2013.01); *C08K 5/01* (2013.01); *C09J 123/26* (2013.01); *H01M 2/0287* (2013.01); *B32B 2553/00* (2013.01); *H01M 2/02* (2013.01); *H01M 10/0525* (2013.01); *Y10T 428/2878* (2015.01); *Y10T 428/31551* (2015.04)

(56) References Cited

U.S. PATENT DOCUMENTS

| | | | |
|---|---|---|---|
| 8,536,268 B2 | 9/2013 | Rickey | |
| 2001/0020515 A1* | 9/2001 | Shibata | C09J 7/387 |
| | | | 156/329 |
| 2004/0059064 A1 | 3/2004 | Usui | |
| 2006/0276607 A1 | 12/2006 | Mori | |
| 2008/0292896 A1 | 11/2008 | Mori | |
| 2008/0306219 A1 | 12/2008 | Mori | |
| 2008/0306234 A1 | 12/2008 | Mori | |
| 2008/0312461 A1 | 12/2008 | Mori | |
| 2009/0043050 A1 | 2/2009 | Mori | |
| 2009/0223409 A1* | 9/2009 | Banning | C07C 233/05 |
| | | | 106/31.13 |
| 2011/0196103 A1 | 8/2011 | Kashiwa | |
| 2013/0338284 A1* | 12/2013 | Ito | C09J 151/06 |
| | | | 524/364 |
| 2014/0134475 A1* | 5/2014 | Kuramoto | B32B 7/12 |
| | | | 429/176 |

FOREIGN PATENT DOCUMENTS

| | | |
|---|---|---|
| JP | 2002173514 A2 | 6/2002 |
| JP | 2006291138 A2 | 10/2006 |
| JP | 2009114319 A2 | 5/2009 |
| JP | 201092703 | 4/2010 |
| JP | 201536385 | 2/2015 |
| KR | 20070087670 A | 8/2007 |
| WO | 2004087775 | 10/2004 |
| WO | 2009087776 A1 | 7/2009 |
| WO | 2012090646 A1 | 7/2012 |
| WO | 2012133683 A1 | 10/2012 |

* cited by examiner

ADHESIVE, LAMINATE, CELL CASE PACKAGING, CELL, HIGH-ALKALI SOLUTION PACKAGING, ALCOHOL-CONTAINING SOLUTION PACKAGING, AND PACKAGE

TECHNICAL FIELD

The present invention relates to an adhesive, a laminate, cell case packaging, a cell, high-alkali solution packaging, alcohol-containing solution packaging, and a package.

To be specific, the present invention relates to an adhesive and a laminate including an adhesive layer formed of the adhesive. Also, the present invention relates to cell case packaging including an inner-side adhesive layer formed of an adhesive and a cell including the cell case packaging. Also, the present invention relates to high-alkali solution packaging including an inner-side adhesive layer formed of an adhesive and a package including the high-alkali solution packaging. Also, the present invention relates to alcohol-containing solution packaging including an inner-side adhesive layer formed of an adhesive and a package including the alcohol-containing solution packaging.

BACKGROUND ART

It has been conventionally known that a laminate including an aluminum foil layer, a thermoplastic resin film layer (inner-side layer) adhering to the inner surface thereof, and an adhesive layer interposed therebetween is used as packaging of a lithium ion secondary cell (cell case packaging).

As the adhesive layer included in the laminate described above, for example, the following adhesive layer has been proposed (ref: for example, the following Patent Document 1). The adhesive layer contains a polyfunctional isocyanate compound and a modified polyolefin resin having a carboxyl group that is obtained by subjecting an ethylenically unsaturated carboxylic acid or an anhydride thereof to graft polymerization with a propylene homopolymer or a copolymer of propylene and ethylene.

The adhesive layer in the following Patent Document 1 has electrolyte resistance that suppresses a reduction over time in the adhesive strength of the aluminum foil layer with the thermoplastic resin film layer caused by contact with an electrolytic solution of the lithium ion secondary cell.

PRIOR ART DOCUMENT

Patent Document

Patent Document 1: Japanese Unexamined Patent Publication No. 2010-92703

SUMMARY OF THE INVENTION

Problem to be Solved by the Invention

Along with further improvement of the above-described electrolyte resistance, the improvement of excellent adhesive strength of the aluminum foil layer with the thermoplastic resin film layer has been required.

The adhesive layer described in the above-described Patent Document 1, however, has a disadvantage of not capable of sufficiently satisfying the above-described requirement.

It is an object of the present invention to provide an adhesive having excellent adhesive strength and a laminate including an adhesive layer formed of the adhesive. Also, it is an object of the present invention to provide cell case packaging including an inner-side adhesive layer formed of an adhesive having excellent adhesive strength and a cell including the cell case packaging. Also, it is an object of the present invention to provide high-alkali solution packaging including an inner-side adhesive layer formed of an adhesive having excellent adhesive strength and a package including the high-alkali solution packaging. Also, it is an object of the present invention to provide alcohol-containing solution packaging including an inner-side adhesive layer formed of an adhesive having excellent adhesive strength and a package including the alcohol-containing solution packaging.

Means for Solving the Problem

An adhesive of the present invention includes a modified olefin polymer (A) allowing a polymer of a C2 to C20 α-olefin having a structural unit derived from a C4 to C20 α-olefin to be modified with a monomer having a functional group capable of reacting with an isocyanate group and having a heat of fusion measured in accordance with JIS K7122 of 0 J/g or more and 50 J/g or less and a polyisocyanate (B).

In the adhesive of the present invention, it is preferable that the polymer has a structural unit derived from propylene.

In the adhesive of the present invention, it is preferable that the content ratio of the structural unit derived from the propylene with respect to 100 mol % of the structural unit derived from the C2 to C20 α-olefin is 40 mol % or more and 95 mol % or less.

In a composition of the present invention, it is preferable that in the polymer, the entire structural unit, excluding the structural unit derived from the propylene, is the structural unit derived from the C4 to C20 α-olefin.

In the adhesive of the present invention, it is preferable that the C4 to C20 α-olefin is 1-butene.

In the adhesive of the present invention, it is preferable that the content ratio of the monomer with respect to 100 parts by mass of the modified olefin polymer (A) is 0.1 parts by mass or more and 15 parts by mass or less.

In the adhesive of the present invention, it is preferable that the functional group is a carboxyl group and/or an anhydride group.

In the adhesive of the present invention, it is preferable that a synthetic hydrocarbon oil is further included.

A laminate of the present invention includes a substrate and an adhesive layer provided at one side of the substrate and formed of an adhesive, wherein the adhesive layer is made of a coating agent including a composition including a modified olefin polymer (A) allowing a polymer of a C2 to C20 α-olefin having a structural unit derived from a C4 to C20 α-olefin to be modified with a monomer having a functional group capable of reacting with an isocyanate group and having a heat of fusion measured in accordance with JIS K7122 of 0 J/g or more and 50 J/g or less and a polyisocyanate (B).

In the laminate of the present invention, it is preferable that the adhesive layer is directly laminated on one surface of the substrate.

In the laminate of the present invention, it is preferable that an adherend adhering to one side of the substrate via the adhesive layer is further included.

Cell case packaging of the present invention includes a substrate, an inner-side layer adhering to the inner side of the substrate, an outer-side layer adhering to the outer side of the substrate, an inner-side adhesive layer interposed between the substrate and the inner-side layer and including a cured material of the above-described adhesive, and an outer-side adhesive layer interposed between the substrate and the outer-side layer.

A cell of the present invention includes the above-described cell case packaging and an electrolytic solution packaged in the cell case packaging, wherein at least a part of the inner-side layer of the cell case packaging is in contact with the electrolytic solution.

High-alkali solution packaging of the present invention includes a substrate, an inner-side layer adhering to the inner side of the substrate, and an inner-side adhesive layer interposed between the substrate and the inner-side layer and including a cured material of the above-described adhesive.

A package of the present invention includes the above-described high-alkali solution packaging and a solution of pH 9 or more packaged in the high-alkali solution packaging.

Alcohol-containing solution packaging of the present invention includes a substrate, an inner-side layer adhering to the inner side of the substrate, and an inner-side adhesive layer interposed between the substrate and the inner-side layer and including a cured material of the above-described adhesive.

A package of the present invention includes the above-described alcohol-containing solution packaging and an alcohol-containing solution packaged in the alcohol-containing solution packaging.

Effects of the Invention

An adhesive of the present invention and a laminate, cell case packaging, a cell, high-alkali solution packaging, alcohol-containing solution packaging, and a package, which include an adhesive layer formed of the adhesive of the present invention, have excellent durability and are capable of sufficiently suppressing a reduction in the adhesive strength.

EMBODIMENT OF THE INVENTION

A composition for preparing an adhesive of the present invention includes a modified olefin polymer (A) and a polyisocyanate (B).

Hereinafter, the modified olefin polymer (A) and the polyisocyanate (B) are described in detail.

1. Modified Olefin Polymer (A)

The modified olefin polymer (A) is obtained by modifying a polymer (a) of a C2 to C20 α-olefin with a monomer (b) having a functional group that is capable of reacting with an isocyanate group.

1-1. Polymer (a) of C2 to C20 α-olefin

The polymer (a) of the C2 to C20 α-olefin has, to be specific, a structural unit derived from a (4 to C20 α-olefin.

That is, the polymer (a) of the C2 to C20 α-olefin is a homopolymer consisting of the C4 to C20 α-olefin or a copolymer consisting of the C4 to C20 α-olefin and a C2 to C3 α-olefin.

An example of the C4 to C20 α-olefin includes a straight-chain or a branched-chain α-olefin such as 1-butene, 1-pentene, 1-hexene, 4-methyl-1-pentene, 1-octene, 1-decene, 1-dodecene, 1-tetradecene, 1-hexadecene, 1-octadecene, and 1-eicosen.

These C4 to C20 α-olefins can be used alone or in combination of two or more.

As the C4 to C20 α-olefin, preferably, a straight-chain C4 to C10 olefin is used, more preferably, a straight-chain C4 to C6 olefin is used, or further more preferably, 1-butene is used. When 1-butene is used as the C4 to C20 α-olefin, both of the excellent solvent solubility and the excellent resin strength can be achieved. These can be used alone or in combination of two or more.

Examples of the C2 to C20 α-olefin include ethylene, propylene, and the above-described C4 to C20 α-olefin. These can be used alone or in combination of two or more.

As the C2 to C20 α-olefin, preferably, ethylene, propylene, and 1-butene are used, or more preferably, propylene and 1-butene are used in combination.

To be specific, examples of the C2 to C20 α-olefin include a copolymer of one or more kinds selected from the C4 to C20 α-olefins and one or more kinds selected from the C2 to C3 α-olefins, and a homopolymer or a copolymer of one or more kinds selected from the C4 to C20 α-olefins. Preferably, a copolymer is used, more preferably, a copolymer of one or more α-olefins selected from the C4 to C20 α-olefins and ethylene and/or propylene is used, or further more preferably, a copolymer of 1-butene and propylene is used. The copolymer of 1-butene and propylene can achieve both of the excellent solvent solubility and the excellent resin strength.

Examples of the copolymer include a random copolymer and a block copolymer. Preferably, a random copolymer is used.

The content ratio of the structural unit derived from the C4 to C20 α-olefin with respect to 100 mol % of the structural unit derived from the C2 to C20 α-olefin is, for example, 5 mol % or more, preferably 10 mol % or more, more preferably 20 mol % or more, or further more preferably 30 mol % or more, and, for example, 100 mol % or less, preferably 60 mol % or less, more preferably 50 mol % or less, or particularly preferably 40 mol % or less. When the above-described content ratio is not more than the above-described upper limit, excellent resin strength can be secured. Meanwhile, when the above-described content ratio is not less than the above-described lower limit, excellent solvent solubility can be secured.

The polymer of the C2 to C20 α-olefin can contain, as an essential structural unit, a structural unit derived from a C2 to C20 (including C4 to C20) α-olefin and, if necessary, can also contain, as an optional structural unit, a structural unit derived from an unsaturated monomer other than the α-olefin (referred to as another unsaturated monomer). Examples of another unsaturated monomer include conjugated polyenes such as butadiene and isoprene and non-conjugated polyenes such as 1,4-hexadiene, 1,7-octadiene, dicyclopentadiene, 5-ethylidene-2-norbornene, 5-vinyl-2-norbornene, 5-methylene-2-norbornene, and 2,5-norbonadiene.

Meanwhile, in the polymer, as the structural unit excluding the structural unit derived from the C4 to C20 α-olefin, preferably, a structural unit entirely derived from the C2 to C3 α-olefin is used, or more preferably, a structural unit entirely derived from the propylene is used.

In other words, in the polymer, the structural unit excluding the structural unit derived from the C2 to C3 α-olefin (preferably, propylene) is the structural unit entirely derived from the C4 to C20 α-olefin. Preferably, the polymer is a copolymer of at least one kind selected from the C4 to C20 α-olefins and the C2 to C3 α-olefin (to be specific, propylene) and does not include a structural component derived from the above-described another unsaturated monomer.

In this case, the content ratio of the structural unit derived from the C2 to C3 α-olefin (preferably, propylene) with respect to 100 mol % of the structural unit derived from the C2 to C20 α-olefin is, for example, 40 mol % or more, preferably 50 mol % or more, more preferably 60 mol % or more, or further more preferably 65 mol % or more, and, for example, 95 mol % or less, preferably 90 mol % or less, more preferably 80 mol % or less, or further more preferably 70 mol % or less. When the above-described content ratio is not more than the above-described upper limit, the melting point (Tm) and the heat of fusion (ΔH) of the copolymer can be reduced. Meanwhile, when the above-described content ratio is not less than the above-described lower limit, excellent resin strength can be secured.

The above-described polymer (a) can be obtained by polymerizing the C2 to C20 α-olefin under the presence of, for example, a known solid Ti catalyst and a metallocene catalyst, which are usually used in the production of the polymer of the α-olefin. The metallocene catalyst consists of, for example, a metallocene compound such as rac-dimethylsilylene-bis{1-(2-methyl-4-phenylindenyl)}zirconium dichloride, an organic aluminumoxy compound such as methylaluminoxane, and an organic aluminum compound such as triisobutylaluminum. To be more specific, the polymer (a) is obtained by, for example, a method described in WO 2004/87775.

The weight average molecular weight (MW) of the obtained polymer (a) measured with gel permeation chromatography (GPC) and calibrated with standard polystyrene is, for example, 10,000 or more and 1,000,000 or less. The molecular weight distribution (degree of dispersion) thereof is 1 or more and 3 or less. The molecular weight distribution is the ratio (Mw/Mn) of the weight average molecular weight (Mw) to the number average molecular weight (Mn).

The melting point (Tm) of the polymer is, for example, less than 120° C., or preferably less than 100° C.

1-2. Monomer (b) Having Functional Group Capable of Reacting with Isocyanate Group

The functional group that is capable of reacting with the isocyanate group is a group having active hydrogen. Examples thereof include a hydroxyl group, an amino group, an epoxy group, a carboxyl group, and an anhydride group shown in the following formula (1). These functional groups can be used alone or in combination of two or more. Preferably, a carboxyl group and an anhydride group are used, or more preferably, an anhydride group is used.

In referring to an anhydride group in the present invention, the anhydride group may have a form of dibasic acid (to be specific, dicarboxylic acid) by allowing a part of or the entire anhydride group to undergo hydrolysis or the like.

The entire functional group is, particularly preferably, a carboxyl group and/or an anhydride group, or most preferably, an anhydride group. When the functional group is a carboxyl group and/or an anhydride group, or preferably, an anhydride group (to be specific, the entire functional group is a carboxyl group and/or an anhydride group, or preferably an anhydride group), in a case where an adhesive layer is formed from the composition to be cured, the carboxyl group and/or the anhydride group, preferably, the anhydride group efficiently reacts with the isocyanate group and improves affinity to a substrate (e.g., aluminum foil etc.) of the modified polyolefin polymer (A), so that the adhesion of the adhesive layer to the substrate (e.g., aluminum foil etc.) can be further improved. Also, the electrolyte resistance can be improved.

: Formula (1)

[Chemical Formula 1]

(1)

Examples of the monomer (b) having the above-described functional group include a hydroxyl group-containing ethylenically unsaturated compound, an amino group-containing ethylenically unsaturated compound, an epoxy group-containing ethylenically unsaturated compound, unsaturated carboxylic acid, unsaturated carboxylic acid anhydride, a vinyl ester compound, and a derivative thereof (excluding unsaturated carboxylic acid anhydride).

Examples of the hydroxyl group-containing ethylenically unsaturated compound include hydroxyl group-containing (meth)acrylate such as hydroxyethyl (meth)acrylate, 2-hydroxypropyl (meth)acrylate, 3-hydroxypropyl (meth)acrylate, 2-hydroxy-3-phenoxy-propyl (meth)acrylate, 3-chloro-2-hydroxypropyl (meth)acrylate, glycerin mono(meth)acrylate, pentaerythritol mono(meth)acrylate, trimethylolpropane mono(meth)acrylate, tetramethylolethane mono(meth)acrylate, butanediol mono(meth)acrylate, polyethylene glycol mono(meth)acrylate, and 2-(6-hydroxhexanoyloxy) ethylacrylate and furthermore, 10-undecene-1-ol, 1-octene-3-ol, 2-methanolnorbornene, hydroxystyrene, N-methylolacrylamide, 2-(meth)acryloyloxyethyl acid phosphate, glycerin monoallyl ether, allyl alcohol, allyloxyethanol, 2-butene-1,4-diol, and glycerin monoalcohol.

An example of the amino group-containing ethylenically unsaturated compound includes a vinyl monomer having at least one kind of amino group or substituted amino group shown by the following formula.

—NHR$_1$— wherein, in the formula, R$_1$ represents, for example, a hydrogen atom; for example, a C1 to C12 alkyl group, or preferably a C1 to C8 alkyl group; or, for example, a C8 to C12 cycloalkyl group, or preferably a C6 to C9 cycloalkyl group. The above-described alkyl group and cycloalkyl group may further contain a substituent.

To be specific, examples of the amino group-containing ethylenically unsaturated compound include alkyl ester derivatives of acrylic acid or methacrylic acid such as aminomethyl (meth)acrylate, propylaminoethyl (meth)acrylate, dimethylaminoethyl methacrylate, aminopropyl (meth)acrylate, phenylaminomethyl methacrylate, and cyclohexylaminoethyl methacrylate; vinylamine derivatives such as N-vinyldiethylamine and N-acetylvinylamine; acrylamide derivatives such as acrylamide, methacrylamide. N-methylacrylamide, N,N-dimethylacrylamide, and N,N-dimethylaminopropylacrylamide; and imides such as p-aminohexylsuccinimide and 2-aminoethylsuccinimide.

An example of the epoxy group-containing ethylenically unsaturated compound includes a monomer having, in a molecule, at least one or more polymerizable unsaturated bonding groups and epoxy groups.

Examples of the epoxy group-containing ethylenically unsaturated compound include glycidyl ester of unsaturated carboxylic acid such as glycidyl acrylate and glycidyl methacrylate; monoglycidyl ester (C1 to C12 alkyl group in the case of monoglycidyl ester) of unsaturated dicarboxylic acid such as maleic acid, fumaric acid, crotonic acid, tetrahydrophthalic acid, itaconic acid, citraconic acid, endo-cis-bicyclo[2,2,1]hept-5-ene-2,3-dicarboxylic acid (nadic Acid™), and endo-cis-bicyclo[2,2,1]hept-5-ene-2-methyl-2,3-dicarboxylic acid (methyl nadic Acid™); alkyl glycidyl ester of p-styrene carboxylic acid; allyl glycidyl ether; 2-methylallyl glycidyl ether; styrene-p-glycidyl ether, 3,4-epoxy-1-butene; 3,4-epoxy-3-methyl-1-butene; 3,4-epoxy-1-pentene; 3,4-epoxy-3-methyl-1-pentene; 5,6-epoxy-1-hexene; and vinylcyclohexene monoxide.

Examples of the unsaturated carboxylic acid include acrylic acid, methacrylic acid, maleic acid, fumaric acid, tetrahydrophthalic acid, itaconic acid, citraconic acid, crotonic acid, isocrotonic acid, norbornene dicarboxylic acid, and bicyclo[2,2,1]hept-2-ene-5,6-dicarboxylic acid.

Examples of the unsaturated carboxylic acid anhydride include maleic anhydride, itaconic anhydride, citraconic anhydride, tetrahydrophthalic anhydride, and bicyclo[2,2,1]hept-2-ene-5,6-dicarboxylic anhydride.

An example of the derivative includes a derivative of unsaturated carboxylic acid such as malenyl chloride, malenyl imide, dimethyl maleate, monomethyl maleate, diethyl maleate, diethyl fumarate, dimethyl itaconate, diethyl citraconate, dimethyl tetrahydrophthalate, dimethyl bicyclo[2,2,1]hept-2-ene-5,6-dicarboxylate, hydroxyethyl (meth)acrylate, hydroxypropyl (meth)acrylate, glycidyl (meth)acrylate, aminoethyl methacrylate, and aminopropyl methacrylate.

Examples of the vinyl ester compound include vinyl acetate, vinyl propionate, vinyl n-butyrate, vinyl isobutyrate, vinyl pivalate, vinyl caproate, vinyl versatate, vinyl laurate, vinyl stearate, vinyl benzoate, vinyl salicylate, and vinyl cyclohexanecarboxylate.

These monomers (b) can be used alone or in combination of two or more.

As the monomer (b), preferably, unsaturated carboxylic acid and unsaturated carboxylic acid anhydride are used, more preferably, unsaturated carboxylic acid anhydride is used, or further more preferably, maleic anhydride is used. Preferably, the entire monomer (b) is unsaturated carboxylic acid anhydride, or more preferably, the entire monomer (b) is maleic anhydride.

When the monomer (b) is the unsaturated carboxylic acid anhydride (to be specific, maleic anhydride) (preferably, when the entire monomer (b) is the unsaturated carboxylic acid anhydride (to be specific, maleic anhydride)), in a case where an adhesive layer is formed from the composition to be cured, the unsaturated carboxylic acid anhydride (to be more specific, maleic anhydride) reacts with the polyisocyanate and improves affinity to a substrate (e.g., aluminum foil etc.) of the modified polyolefin polymer (A), so that the adhesion of the adhesive layer to the substrate (e.g., aluminum foil etc.) can be further improved.

In the present invention, for example, the polymer (a) can be also modified by using the monomer (b) having the above-described functional group and a monomer (b') (e.g., ethylenically unsaturated compound such as alkyl (meth)acrylate etc.) not having the above-described functional group in combination. Preferably, the polymer (a) is modified only with the monomer (b) having the above-described functional group without using the monomer (b') not having the functional group in combination. With this modification, the polymer (a) is modified with the monomer (b) having a functional group without the presence of the monomer (b') not having a functional group. In this manner, the modified olefin polymer (A) can efficiently react with the polyisocyanate and thus, electrolyte resistance can be improved.

1-3. Preparation of Modified Olefin Polymer (A)

To prepare the modified olefin polymer (A), the monomer (b) may be subjected to polymerization reaction under the presence of the polymer (a). In this manner, the polymer (a) is modified with the monomer (b) or the polymer thereof. To be specific, to prepare the modified olefin polymer (A), the following methods of (1) to (4) are used:

(1) a method in which the polymer (a) is dissolved in an organic solvent and the monomer (b) and a radical polymerization initiator are added thereto to be heated and stirred, so that the polymer (a) is modified with the monomer (b) to be reacted;

(2) a method in which the polymer (a) is heated and melted and then, the monomer (b) and a radical polymerization initiator are added to the obtained melted material to be stirred, so that the polymer (a) is modified with the monomer (b) to be reacted;

(3) a method in which the polymer (a), the monomer (b), and a radical polymerization initiator are mixed in advance and then, while the obtained mixture is supplied to an extruder to be heated and kneaded, the polymer (a) is modified with the monomer (b) to be reacted; and (4) a method in which a solution prepared by dissolving the monomer (b) and a radical polymerization initiator in an organic solvent is immersed in the polymer (a) and thereafter, the obtained mixture is heated until the maximum temperature at which the polymer (a) is not dissolved, so that the polymer (a) is modified with the monomer (b) to be reacted.

The mixing ratio of the monomer (b) is not particularly limited as long as the ultimately necessary modified amount of the monomer (b) is obtained. The mixing ratio thereof with respect to 100 parts by mass of the total amount of the polymer (a) and the monomer (b) is, for example, 0.1 parts by mass or more, or preferably 0.5 parts by mass or more, and, for example, 15 parts by mass or less, preferably 10 parts by mass or less, more preferably 5 parts by mass or less, further more preferably 4 parts by mass or less, or particularly preferably 2 parts by mass or less.

The reaction temperature is, for example, 50° C. or more, or preferably 80° C. or more, and, for example, 200° C. or less. The reaction time is, for example, about 1 minute to 10 hours.

Examples of a reaction method include a batch method and a continuous method. To uniformly perform a modification reaction, preferably, a batch method is used.

Examples of the radical polymerization initiator include an organic peroxide and an organic perester.

Examples of the organic peroxide include dicumyl peroxide, benzoyl peroxide, dichloro benzoyl peroxide, dicumyl peroxide, di-tert-butyl peroxide, 2,5-dimethyl-2,5-di(peroxybenzoate)hexyne-3, 1,4-bis(tert-butylperoxyisopropyl)benzene, lauroyl peroxide, 2,5-dimethyl-2,5-di(tert-butylperoxy)hexyne-3, 2,5-dimethyl-2,5-di(tert-butylperoxide)hexane, and tert-butylperoxybenzoate.

Examples of the organic perester include tert-butyl peracetate, tert-butyl perphenylacetate, tert-butyl perisobutylate, tert-butyl per-sec-octoate, tert-butyl perpivalate, cumyl perpivalate, and tert-butyl perdiethyl acetate. Furthermore, an example of the radical polymerization initiator includes another azo compound such as azobis-isobutyl nitrile and dimethyl azoisobutyl nitrile.

Of the radical polymerization initiators, preferably, an organic peroxide is used, or more preferably, dialkyl peroxide such as dicumyl peroxide, di-tert-butyl peroxide, 2,5-dimethyl-2,5-di(tert-butylperoxy)hexyne-3,2,5-dimethyl-2,5-di(tert-butylperoxy)hexane, and 1,4-bis(tert-butylperoxyisopropyl)benzene is used.

The mixing ratio of the radical polymerization initiator with respect to 100 parts by mass of the modified olefin polymer (A) is, for example, 0.001 parts by mass or more and 10 parts by mass or less.

The preparation of the modified olefin polymer (A) is performed under the presence of a solvent or without a solvent in the above-described methods of (1) to (4).

Examples of the solvent include aromatic hydrocarbon such as benzene, toluene, and xylene; aliphatic hydrocarbon such as hexane, heptane, octane, and decane; alicyclic hydrocarbon such as cyclohexane, cyclohexene, and methyl cyclohexane; alcohol such as methanol, ethanol, isopropyl alcohol, butanol, pentanol, hexanol, propanediol, and phenol; ketone such as acetone, methyl isobutyl ketone, methyl ethyl ketone, pentanone, hexanone, isophorone, and acetophenone; cellosolve such as methyl cellosolve and ethyl cellosolve; ester such as methyl acetate, ethyl acetate, butyl acetate, methyl propionate, and butyl formate; and halogenated hydrocarbon such as trichloroethylene, dichloroethylene, and chlorobenzene. Among these, preferably, aromatic hydrocarbon, aliphatic hydrocarbon, and ketone are used. These solvents can be used alone or in combination of two or more.

When the modification of the polymer (a) of the α-olefin is performed under the presence of a solvent, the obtained modified olefin polymer (A) is prepared as a solution thereof, to be specific, as a varnish.

1-4. Properties of Modified Olefin Polymer (A)

The weight average molecular weight (Mw) of the modified olefin polymer (A) measured with GPC and calibrated with standard polystyrene is, for example, $1 \times 10^4$ or more, preferably $2 \times 10^4$ or more, or more preferably $3 \times 10^4$ or more, and, for example, $1000 \times 10^4$ or less, preferably $100 \times 10^4$ or less, or more preferably $50 \times 10^4$ or less.

When the weight average molecular weight is not less than the above-described lower limit, the strength of the coated film can be sufficiently increased and the adhesive strength becomes excellent. Meanwhile, when the weight average molecular weight is not more than the above-described upper limit, the solvent solubility is excellent and the solidification and the deposition do not easily occur. Among all, when the weight average molecular weight of the modified olefin polymer (A) is $50 \times 10^4$ or less, the adhesive properties, in particular, tend to be excellent.

The melting point (Tm) of the modified olefin polymer (A) is, for example, less than 120° C., preferably less than 100° C., more preferably 90° C. or less, or further more preferably 80° C. or less, and, for example, 40° C. or more, or preferably 50° C. or more.

The melting point (Tm) of the modified olefin polymer (A) is obtained by differential scanning calorimetry (DSC) in accordance with JIS K 7122. To be specific, in a process where the temperature was first increased from 30° C. to 180° C. at 10° C./min and then, the temperature is retained for three minutes and next, the temperature was decreased until 0° C. at 10° C./min, then, the temperature is retained for three minutes, and thereafter, the temperature is again increased until 150° C. at 10° C./min, the melting point of the modified olefin polymer (A) is obtained by a thermogram at the time of second heating in accordance with JIS K 7122.

When the melting point (Tm) of the modified olefin polymer (A) is not more than the above-described upper limit, a reduction in the adhesive strength can be prevented, even in a case where the adhesive layer is formed (described later) by being aged at a low temperature after the application of the composition. When the melting point (Tm) of the modified olefin polymer (A) is not less than the above-described lower limit, excellent resin strength can be secured.

The heat of fusion (ΔH) of the modified olefin polymer (A) is, for example, 0 J/g or more, preferably 3 J/g or more, or more preferably 5 J/g or more, and, for example, 50 J/g or less, preferably 40 J/g or less, or more preferably 30 J/g or less.

When the heat of fusion (ΔH) of the modified olefin polymer (A) is not more than the above-described upper limit, a reduction in the adhesive strength can be prevented, even in a case where the adhesive layer is formed (described later) by being aged at a low temperature after the application of a coating agent (described later) consisting of the composition. Meanwhile, when the heat of fusion (ΔH) of the modified olefin polymer (A) is not less than the above-described lower limit, in a case where a coating agent (described later) consisting of the composition is applied to a substrate and thereafter, a coated film is formed, excellent strength can be imparted thereto.

The heat of fusion (ΔH) is obtained by differential scanning calorimetry (DSC) in accordance with JIS K. 7122. To be specific, the heat of fusion (ΔH) is calculated from the peak area of a thermogram obtained in a heating process at 10° C./min. In the measurement, in the present invention, for the purpose of cancelling the thermal history before measurement, the temperature is increased to 180° C. at 10° C./min and the temperature is retained for three minutes before the measurement; next, the temperature is decreased until 0° C. at 10° C./min and the temperature is retained for three minutes; and thereafter, the heat of fusion (ΔH) is measured.

The half crystallization time at 50° C. of the modified olefin polymer (A) is, for example, 100 seconds or more, preferably 300 seconds or more, more preferably 500 seconds or more, or further more preferably 700 seconds or more. The preferable range of the modified olefin polymer (A) includes a case where crystallization does not substantially occur, that is, the value of the half crystallization time is too large to obtain, that is, the half crystallization time is the infinite.

The half crystallization time is obtained in isothermal crystallization measurement with a differential scanning calorimeter and means the time reaching 50% heat, when the area between the DSC curve and the base line in an isothermal crystallization process is defined as the total heat [ref: New Polymer Experiment 8, Properties of Polymer (published by Kyoritsu Shuppan Co., Ltd)].

When the half crystallization time at 50° C. of the modified olefin polymer (A) is not less than the above-described lower limit, in the case of using the composition as the adhesive, the modified olefin polymer (A) can react with the polyisocyanate (B), while or after infiltrating unevenness in the surface of a substrate or an adherend (anchor effect). Thus, the adhesive strength of the adhesive layer can be further improved based on the anchor effect of the adhesive.

The kinetic viscosity at 40° C. of the modified olefin polymer (A) is preferably above 500000 cSt. The concept of "above 500000 cSt of the kinetic viscosity" includes a case where the fluidity is low and the kinetic viscosity cannot be measured.

The modified amount (introduced amount) of the monomer (b) in the modified olefin polymer (A), that is, the content ratio of the structural unit derived from the monomer (b) in the modified olefin polymer (A) with respect to 100 parts by mass of the modified olefin polymer (A) is, for example, 0.1 parts by mass or more, or preferably 0.5 parts by mass or more, and, for example, 15 parts by mass or less, preferably 10 parts by mass or less, more preferably 5 parts by mass or less, further more preferably 4 parts by mass or less, or particularly preferably 2 parts by mass or less.

By setting the content ratio of the monomer (b) within the above-described range, the modified olefin polymer (A) and the polyisocyanate (B) can efficiently react and thus, the electrolyte resistance can be improved. Meanwhile, when the mixing ratio of the monomer (b) is above the above-described upper limit, there may be a case where the amount of a polar group (functional group) increases, so that the electrolyte resistance is reduced. When the mixing ratio of the monomer (b) is less than the above-described lower limit, there may be a case where the adhesive properties to a substrate cannot be ensured, so that the adhesive strength and the electrolyte resistance are reduced.

The above-described modified amount is set, for example, by a known method such as $^1$H-NMR measurement. The following conditions can be illustrated as specific $^1$H-NMR measurement conditions.

That is, the conditions are as follows: a nuclear magnetic resonance apparatus of ECX 400 type manufactured by JEOL Ltd.; solvent: deuterated ortho-dichlorobenzene; sample concentration: 20 mg/0.6 mL; measurement temperature: 120° C.; observed nucleus: $^1$H (400 MHz); sequence: single pulse; pulse width: 5.12 μsec (45° pulse); repetition time: 7.0 seconds; and cumulative number: 500 times or more. In the reference chemical shift, hydrogen in tetramethylsilane is 0 ppm. The same result can be also obtained by, for example, defining the peak derived from the residual hydrogen in the deuterated ortho-dichlorobenzene at 7.10 ppm as the reference value of the chemical shift. The peak derived from the monomer (b) such as 1H can be assigned by a conventional method.

When the unsaturated carboxylic acid and the anhydride thereof are used as the monomer (b), for example, the acid value can be also used as a reference amount of the amount of the functional group introduced into the modified olefin polymer (A).

The acid value of the modified olefin polymer (A) is, for example, 0.1 mgKOH/g or more, or preferably 0.5 mgKOH/g or more, and, for example, 100 mgKOH/g or less, preferably 30 mgKOH/g or less, or more preferably 10 mgKOH/g or less.

An example of the measurement method of the acid value includes the following method.

That is, the basic operation is in accordance with JIS K-2501-2003. To be specific, about 10 g of the modified olefin polymer is accurately measured to be put into a 200 mL-tall beaker. Then, as a titration solvent, 150 mL of a mixed solvent prepared by mixing xylene and dimethylformamide at a ratio of 1:1 (volume ratio) is added thereto. As an indicator, a few drops of 1 w/v % phenolphthalein ethanol solution (manufactured by Wako Pure Chemical Industries, Ltd.) is added to the obtained mixture. The liquid temperature is heated at 80° C. and the sample is dissolved. After the liquid temperature is fixed at 80° C., titration is performed by using a 2-propanol solution of 0.1 mol/L potassium hydroxide (manufactured by Wako Pure Chemical Industries, Ltd.) and the acid value is obtained from the titer.

The calculation formula is as follows: Acid value (mg-KOH/g)=(EP1−BL1)×FA1×C1/SIZE In the above-described calculation formula, EP1 shows the titer (mL); BL1 shows a blank value (mL); FA1 shows a factor (1.00) of the titration liquid; C1 shows a concentration conversion value (5.611 mg/mL: equivalent of potassium hydroxide in 1 mL of potassium hydroxide solution of 0.1 mol/L KOH); and SIZE shows a collected amount (g) of the sample.

The measurement is repeated three times and the obtained average value is defined as the acid value.

These modified olefin polymers (A) can be used alone or in combination of two or more.

The modified olefin polymer (A) can be also prepared as a composition containing the modified olefin polymer (A) prepared by the above-described method (i) and the polymer (a) of the C2 to C20 α-olefin before modification (that is, unmodified polymer (a)), that is, as a modified olefin polymer composition.

The unmodified polymer (a) is mixed in the modified olefin polymer (A) so that the mixing ratio of the modified olefin polymer (A) with respect to 100 parts by mass of the modified olefin polymer composition, that is, 100 parts by mass of the total of the modified olefin polymer (A) and the unmodified polymer (a) is, for example, 0.1 parts by mass or more, or preferably 0.5 parts by mass or more, and, for example, 15 parts by mass or less, or preferably 10 parts by mass or less.

The properties of the modified olefin polymer composition are, as a whole, the same as those of the above-described modified olefin polymer (A).

2. Polyisocyanate (B)

Examples of the polyisocyanate (B) include a polyisocyanate monomer and a polyisocyanate modified product.

Examples of the polyisocyanate monomer include aromatic polyisocyanate, araliphatic polyisocyanate, and aliphatic polyisocyanate.

An example of the aromatic polyisocyanate includes aromatic diisocyanate such as tolylene diisocyanate (2,4- or 2,6-tolylene diisocyanate or mixture thereof) (TDI), phenylene diisocyanate (m-, p-phenylene diisocyanate or mixture thereof), 4,4'-diphenyl diisocyanate, 1,5-naphthalene diisocyanate (NDI), diphenylmethane diisocyanate (4,4'-, 2,4'- or 2,2'-diphenylmethane diisocyanate or mixture thereof) (MDI), 4,4'-toluidine diisocyanate (TODI), and 4,4'-diphenylether diisocyanate.

An example of the araliphatic polyisocyanate includes araliphatic diisocyanate such as xylene diisocyanate (1,3- or 1,4-xylylene diisocyanate or mixture thereof) (XDI), tetramethylxylylene diisocyanate (1,3- or 1,4-tetramethyl xylylene diisocyanate or mixture thereof) (TMXDI), and ω,ω'-diisocyanate-1,4-diethylbenzene.

An example of the aliphatic polyisocyanate includes aliphatic diisocyanate such as trimethylene diisocyanate, 1,2-propylene diisocyanate, butylene diisocyanate (tetramethylene diisocyanate, 1,2-butylene diisocyanate, 2,3-butylene diisocyanate, and 1,3-butylene diisocyanate), 1,5-pentamethylene diisocyanate (PDI), 1,6-hexamethylene diisocyanate (HDI), 2,4,4- or 2,2,4-trimethylhexamethylene diisocyanate, and 2,6-diisocyanate methyl caproate.

An example of the aliphatic polyisocyanate includes alicyclic polyisocyanate. An example of the alicyclic polyisocyanate includes alicyclic diisocyanate such as 1,3-cyclopentane diisocyanate, 1,3-cyclopentene diisocyanate, cyclohexane diisocyanate (1,4-cyclohexane diisocyanate, 1,3-cyclohexane diisocyanate), 3-isocyanatomethyl-3,5,5-trimethylcyclohexyl isocyanate (isophorone diisocyanate) (IPDI), methylenebis(cyclohexyl isocyanate) (4,4'-, 2,4'-, or 2,2'-methylenebis(cyclohexyl isocyanate, Trans of these, Trans-body, Trans, Cis-body, Cis, Cis-body, or mixture thereof)) ($H_{12}$MDI), methylcyclohexane diisocyanate (methyl-2,4-cyclohexane diisocyanate, methyl-2,6-cyclohexane diisocyanate), norbornane diisocyanate (various isomers or mixture thereof) (NBDI), and bis(isocyanatomethyl) cyclohexane (1,3- or 1,4-bis(isocyanatomethyl)cyclohexane or mixture thereof) ($H_6$XDI).

These polyisocyanate monomers can be used alone or in combination of two or more.

The polyisocyanate modified product has above two of the average number of functional group and examples thereof include multimer of the above-described polyisocyanate monomer (e.g., dimer, trimer (e.g., isocyanurate modified product, iminooxadiazine dione modified product), pentamer, heptamer, etc.); allophanate modified product (e.g., allophanate modified product produced by reaction of the above-described polyisocyanate monomer with monool (e.g., octadecanol etc.) etc.); polyol modified product (e.g., polyol modified product (alcohol adduct) produced by reaction of polyisocyanate monomer with low-molecular weight polyol (e.g., trihydric alcohol etc.) etc.); biuret modified product (e.g., biuret modified product produced by reaction of the above-described polyisocyanate monomer with water or amines etc.); urea modified product (e.g., urea modified product produced by reaction of the above-described polyisocyanate monomer with diamine etc.); oxadiazine trione modified product (e.g., oxadiazine trione produced by reaction of the above-described polyisocyanate monomer with carbonic acid gas etc.); carbodiimide modified product (e.g., carbodiimide modified product produced by decarbonation condensation reaction of the above-described polyisocyanate monomer etc.); uretdione modified product; and uretonimine modified product.

An example of the monool includes aliphatic monool such as butanol, pentanol, hexanol, heptanol, octanol, nonanol, decanol, undecyl alcohol, dodecyl alcohol (lauryl alcohol), tridecyl alcohol, tetradecyl alcohol, (myristyl alcohol), pentadecyl alcohol, hexadecyl alcohol, (cetyl alcohol), heptadecyl alcohol, octadecyl alcohol (stearyl alcohol, octadecanol), nonadecyl alcohol, and isomers thereof (including 2-methyl-1-propanol (iso-butanol)); furthermore, another alkanol (C20 to C50 alcohol); alkenyl alcohol such as oleyl alcohol; alkadienol such as octadienol; and polyethylene butylene monool. Examples of the monool also include alicyclic monool such as cyclohexanol and methyl cyclohexanol and araliphatic monool such as benzyl alcohol.

Furthermore, an example of the polyisocyanate modified product also includes polymethylene polyphenyl polyisocyanate (crude MDI, polymeric MDI).

These polyisocyanate modified products can be used alone or in combination of two or more.

These polyisocyanates (B) can be used alone or in combination of two or more.

3. Synthetic Hydrocarbon Oil (D)

The composition can also further contain a synthetic hydrocarbon oil (D).

An example of the synthetic hydrocarbon oil (D) includes a polymer of a C2 to C20 olefin. Among all, preferably, an oligomer obtained by homopolymerizing a C2 to C20 olefin or an oligomer obtained by copolymerizing arbitrary mixtures of two or more olefins is used. Examples of the above-described C2 to C20 olefin include ethylene, propylene, 1-butene, 1-octene, 1-decene, and 1-dodecene.

As the synthetic hydrocarbon oil (D), an ethylenic copolymer having a structural unit derived from ethylene and a structural unit derived from a C3 to C20 α-olefin can be preferably used. In such a case, the amount of the structural unit derived from the ethylene with respect to 100 mol % of the total of the structural unit derived from the ethylene and the structural unit derived from the C3 to C20 α-olefin is, for example, 30 mol % or more, or preferably 40 mol % or more, and, for example, 70 mol % or less, or preferably 60 mol % or less.

These synthetic hydrocarbon oils (D) can be used alone or in combination of two or more.

The kinetic viscosity at 40° C. of the synthetic hydrocarbon oil (D) is, for example, 30 cSt or more, preferably 300 cSt or more, or more preferably 5,000 cSt or more, and, for example, 500,000 cSt or less, preferably 400,000 cSt or less, or more preferably 300,000 cSt or less.

4. Preparation Method of Composition

To prepare a composition, the above-described modified olefin polymer (A), the polyisocyanate (B), and the synthetic hydrocarbon oil (D) blended as required are blended so that the equivalent ratio (NCO/functional group) of the isocyanate group to the functional group capable of reacting with the isocyanate group is, for example, 0.01 or more, or preferably 0.1 or more, and, for example, 50 or less, preferably 30 or less, more preferably 1.7 or less, or further more preferably 0.99 or less.

An isocyanate index is described in detail in Examples to be described later.

The ratio ((A)/(B)) of the above-described modified olefin polymer (A) to the polyisocyanate (B) is appropriately selected so as to be the above-described isocyanate index and, to be specific, in terms of mass, for example, 80/1 or less, or preferably 60/1 or less, and, for example, 1/10 or more, or preferably 1/8 or more.

The mixing ratio of the synthetic hydrocarbon oil (D) blended as required with respect to 100 mass % of the total of the modified olefin polymer (A) and the synthetic hydrocarbon oil (D) is, for example, 1 mass % or more and 80 mass % or less.

Also, an additive may be blended into the composition or each of the components configuring the composition, to be specific, any one of or all of the modified olefin polymer (A), the polyisocyanate (B), and the synthetic hydrocarbon oil (D) as required. Examples of the additive include stabilizers (including photostabilizers and thermal stabilizers) such as epoxy resins, curing catalysts, leveling agents, antifoaming agents, antioxidants, and ultraviolet absorbers; plasticizers; surfactants; pigments; thixotropic agents; thickening agents; tackifiers; surface conditioners: antisetting agents; weather-resistant agents; pigment dispersants; antistatic agents; fillers; organic or inorganic microparticles; fungicides; and silane coupling agents.

In the above-described preparation, the composition can be prepared as a varnish by blending with the above-described solvent.

An example of the solvent includes the same solvent as that described above. Preferable examples thereof include toluene, a methylcyclohexane/methylisobutylketone mixed solvent, a methylcyclohexane/methylethylketone mixed solvent, a cyclohexane/methylethylketone mixed solvent, and a cellosolves/cyclohexanone mixed solvent. Water can be also used as dispersion medium.

Preferably, in view of processability, the composition is used as a varnish by being blended with a solvent, or more preferably, the composition is used by being dissolved in a solvent.

The solvent is blended into the composition so that the content ratio of the non-volatile content with respect to 100 parts by mass of the varnish is, for example, 5 parts by mass or more, or preferably 10 parts by mass or more, and, for example, 50 parts by mass or less, or preferably 40 parts by mass or less.

When the modified olefin polymer (A) is prepared as a varnish, the solvent configuring the varnish can be also used as a solvent for the above-described preparation.

5. Coating Agent

The composition prepared in this manner can be also used as a coating agent.

The coating agent is preferably used as primers, coatings, hot-melt adhesives, or optically transparent double-sided tapes. A laminate having at least one layer obtained from the coating agent is preferably used as a decorative film.

When the composition is used as the coating agent, an additive can be also added at an appropriate proportion as required. Examples of the additive include pigments such as titanium oxide (rutile type), zinc oxide, and carbon black; thixotropic agents; thickening agents; tackifiers such as rosin resin and terpene resin; furthermore, antifoaming agents; surface conditioners; antisetting agents; antioxidants; weather-resistant agents; thermal stabilizers; photostabilizers; pigment dispersants; and antistatic agents.

The method for forming a coated film from the coating agent is not particularly limited and a known method can be used. After the coating agent is applied to a substrate by an application method, the applied substrate is dried by an appropriate method such as natural drying or heating forced drying. Examples of the application method include die coating method, flow coating method, spray coating method, bar coating method, gravure coating method, gravure reverse coating method, kiss reverse coating method, microgravure coating method, roll coating method, blade coating method, rod coating method, roll doctor coating method, air knife coating method, comma roll coating method, reverse roll coating method, transfer roll coating method, kiss roll coating method, curtain coating method, and dipping coating method. In this manner, the coated film is obtained.

The coated film after drying has a thickness of, for example, 0.2 μm or more, or preferably 1 μm or more, and, for example, 100 μm or less, or preferably 20 μm or less.

When a laminate having at least one layer of the coated film formed from the coating agent is used as a decorative film, it can be used in combination with a film having known design properties. For example, a film that is decorated in advance by printing, coating, or deposition, or a film that is decorated by combination of these is defined as a design layer. The obtained design layer and the coated film formed from the coating agent are laminated.

An example of the film having a design layer includes a thermoplastic film such as acrylic film, PET film, polycarbonate film, COC (cyclic olefin copolymer) film, vinyl chloride film, and ABS.

When a laminate having at least one layer of the coated film formed from the coating agent is used as a decorative film, the method for producing the decorative film is not particularly limited. Examples thereof include a method in which a coated film is dry laminated by transfer to a surface facing an adherend of the decorative film having a design layer, a method in which a design layer is directly provided in a coated film by printing or the like, and a method in which a clear layer, another coating layer, and a coated film are sequentially formed in the above-described film by printing or the like.

When a laminate having at least one layer of the coated film formed from the coating agent is used as a decorative film, decoration can be applied to a molded article having a complicated three-dimensional structure by using, for example, an existing vacuum molding method such as a vacuum molding method and a compressed air vacuum molding method; an insert molding method and an in-mold molding method; or a TOM method with a "Vacuum Molding Device" described in U.S. Pat. No. 3,733,564 in Patent Gazette. Examples of the adherend of the decorative film include polyolefin materials such as PP; polyamide resins such as nylon; polar resins such as ABS, PC, PET, PPS, and acrylic resin; and inorganic materials such as ED steel plate, MG alloy, SUS (stainless steel), aluminum, aluminum alloy, and glass. An example thereof also includes an adherend obtained by compounding the above-described resin and the above-described inorganic material. In the decorative film, for example, the coated film obtained from the coating agent adheres to the adherend.

Examples of the molded article obtained by the above-described decorative method include automobile interior and exterior members; various front panels such as AV device; surface decorative members such as button and emblem; various members such as cases of information appliances including cell phone and camera, housing, display window, and button; exterior materials for furniture; interior materials for construction such as bathroom, wall, ceiling, and floor; exterior materials for construction such as outer wall including siding, fence, roof, gate, and verge board; surface decorative members of furniture such as window frame, door, handrail, threshold, and lintel; optical members such as various displays, lens, mirror, goggles, and window glass; interior and exterior members of various vehicles other than automobiles such as trains, airplanes, and ships; and other various uses such as various packaging containers including bottle, cosmetic container, and container for small items and miscellaneous goods including packaging material, gift, and small items.

6. Use of Coating Agent as Adhesive

The coating agent is used as an adhesive of the present invention for forming an adhesive layer.

When the coating agent is used as the adhesive, an additive may be blended as required. Examples thereof include stabilizers such as epoxy resins, curing catalysts, leveling agents, antifoaming agents, antioxidants, and ultraviolet absorbers; plasticizers; surfactants; pigments; fillers; organic or inorganic microparticles; fungicides; and silane coupling agents.

Hereinafter, a specific example at the time of being used as an adhesive is described. That is, to be specific, the adhesive layer is laminated on a surface (one-side surface) of a substrate and a laminate (e.g., adhesive sheet) is formed of the substrate and the adhesive layer.

Examples of the substrate include films made of polyolefin materials such as PP; films made of polar resins such as ABS, PC, PET, PPS, polyamide, and acrylic resin; and metal foils made of ED steel plate. Mg alloy, SUS (stainless steel), aluminum, and aluminum alloy. Preferably, a metal foil is used, or more preferably, an aluminum foil is used. The substrate has a thickness of, for example, 1 μm or more, or preferably 5 μm or more, and, for example, 500 μm or less, or preferably 100 μm or less.

To laminate the adhesive layer on the surface of the substrate, for example, the coating agent is applied by the above-described application method. Thereafter, when the coating agent includes a solvent, the applied coating agent is heated, so that the solvent is distilled off. In this manner, the adhesive layer is formed.

The adhesive layer has a thickness of, for example, 0.2 μm or more, or preferably 1 μm or more, and, for example, 100 μm or less, or preferably 20 μm or less.

In this manner, the laminate including the substrate and the adhesive layer is produced.

Furthermore, an adherend is provided on the surface (one-side surface) of the above-described adhesive layer and the laminate made of this can be also configured.

Examples of the adherend include polyolefin materials such as PP; polar resins such as ABS, PC, PET, PPS, polyamide, and acrylic resin; and inorganic materials such as ED steel plate, MG alloy, SUS (stainless steel), aluminum, aluminum alloy, and glass. An example thereof also includes an adherend obtained by compounding the above-described resin and the above-described inorganic material. Preferably, a film made of a polyolefin material and a molded article are used. Also, treatment such as corona treatment can be applied to an adhesive surface (surface in contact with the adhesive layer) of the adherend.

To provide an adherend on the surface of the adhesive layer, the adherend is brought into contact with the surface of the adhesive layer. In this manner, the adhesive layer is interposed between the substrate and the adherend. That is, the laminate including the substrate, the adherend, and the adhesive layer is produced.

Thereafter, the laminate is heated, so that the adhesive layer cures. In this manner, the substrate and the adherend adhere to each other by the adhesive layer.

Appropriate conditions are selected as the heating conditions. Examples thereof include a method (low-temperature aging method) in which aging is performed at a low temperature of, for example, 80° C. or less, or preferably 70° C. or less, and, for example, 40° C. or more, for a long time of, for example, one day or more, or preferably three days or more, and, for example, seven days or less and a method (high-temperature thermocompression bonding method) in which thermocompression bonding is performed at a high temperature of, for example, 100° C. or more, or preferably 120° C. or more, and, for example, 200° C. or less, for a short time of, for example, 0.1 seconds or more, or preferably 0.5 seconds or more, and, for example, 60 seconds or less. The pressure in the high-temperature thermocompression bonding method is, for example, 0.1 MPa or more, or preferably 0.2 MPa or more, and, for example, 2 MPa or less.

Preferably, a low-temperature aging method is selected.

The adhesive layer cures by the above-described heating. That is, the functional group in the modified olefin polymer (A) reacts with the isocyanate group in the polyisocyanate (B). In this manner, the substrate strongly adheres to the adherend via the adhesive layer. The adhesive layer has a thickness of, for example, 0.2 μm or more, or preferably 1 μm or more, and, for example, 100 μm or less, or preferably 20 μm or less.

7. Usage of Laminate

The laminate is preferably used as cell case packaging having excellent adhesive strength and excellent electrolyte resistance, high-alkali solution packaging having excellent adhesive strength and excellent alkali resistance, and furthermore, alcohol-containing solution packaging having excellent adhesive strength and excellent alcohol resistance.

7-1. Cell Case Packaging and Cell

Figure 1:
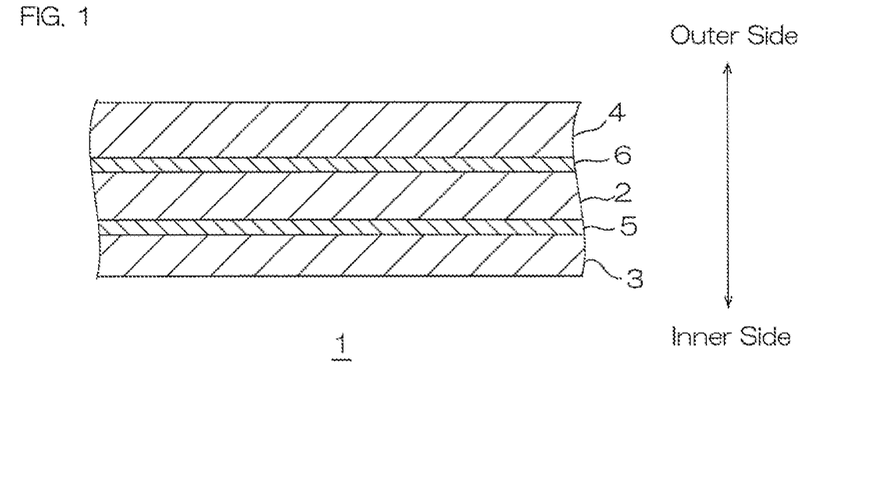
FIG. 1 shows a sectional view of cell case packaging that is one embodiment of a laminate of the present invention.

Next, cell case packaging is described with reference to FIG. 1. In FIG. 1, the upper side of the paper surface is described as an outer side and the lower side of the paper surface is described as an inner side.

As shown in FIG. 1, cell case packaging 1 includes a substrate 2, an inner-side layer 3 adhering to the inner side of the substrate 2, an outer-side layer 4 adhering to the outer side of the substrate 2, an inner-side adhesive layer 5 interposed between the substrate 2 and the inner-side layer 3, and an outer-side adhesive layer 6 interposed between the substrate 2 and the outer-side layer 4.

The substrate 2 corresponds to the above-described substrate and is not particularly limited. Preferably, a metal foil is used, or more preferably, an aluminum foil and an SUS foil are used. In view of corrosion resistance, chemical conversion treatment can be applied to the surface of the substrate.

The inner-side layer 3 corresponds to the above-described adherend and is not particularly limited. To impart chemical resistance and heat-sealing properties to the cell case packaging, preferably, a thermoplastic polyolefin film such as unstretched polypropylene film is used.

The inner-side adhesive layer 5 corresponds to the above-described adhesive layer.

The outer-side layer 4 is not particularly limited. To impart heat resistance in a heat sealing step at the time of production of a cell, molding properties at the time of processing, pinhole resistance, and insulating properties at the time of circulation, preferably, a multilayer film obtained by laminating a single layer or two or more layers of a stretched or an unstretched film such as polyester film, polyamide film, or polypropylene film is used.

The cell case packaging 1 has a thickness of, for example, 60 to 160 μm.

The adhesive of the present invention may be used at least for the inner-side adhesive layer 5. As the adhesive of the outer-side adhesive layer 6, as long as the adhesive properties of the outer-side layer 4 to the substrate 2 are ensured, another arbitrary adhesive such as adhesive for dry laminate and solventless type adhesive can be also used as well as the adhesive of the present invention.

Next, a cell including the cell case packaging in which the above-described adhesive is used for the inner-side adhesive layer is described with reference to FIG. 2.

Figure 2:
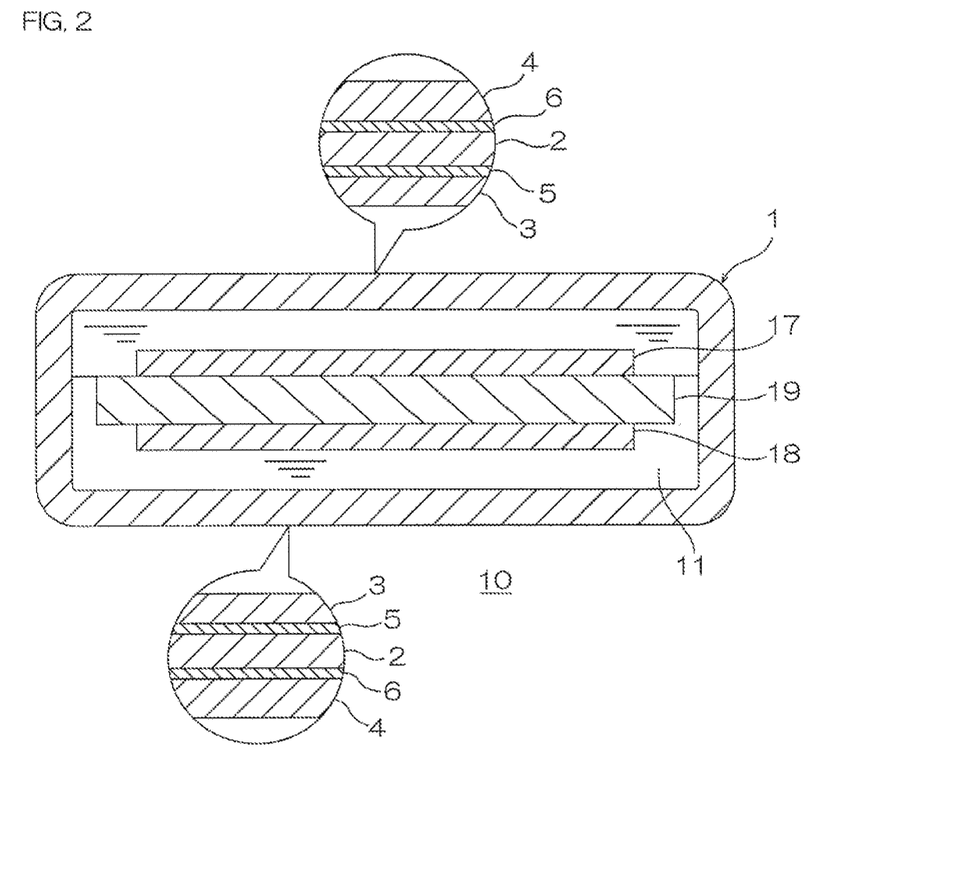
FIG. 2 shows a sectional view of one embodiment of a cell of the present invention.

As shown in FIG. 2, a cell 10 includes the cell case packaging 1 and an electrolytic solution 11 packaged in the cell case packaging 1. The cell 10 includes a positive electrode 17, a negative electrode 18, and a separator 19 that are housed in the cell case packaging 1.

The cell case packaging 1 is configured to be a bag shape so that the electrolytic solution 11 to be described next is in contact with the inner surface of the inner-side layer 3 in the cell case packaging 1. To be specific, the cell case packaging 1 packages the electrolytic solution 11 so that the inner-side layer 3 is in contact with the electrolytic solution 11.

The electrolytic solution 11 is not particularly limited and contains, for example, ethylene carbonate, diethyl carbonate, dimethyl carbonate, and lithium salt such as lithium hexafluorophospohate.

The positive electrode 17 and the negative electrode 18 are disposed in opposed relation at spaced intervals to each other so as to be in contact with the electrolytic solution 11. The separator 19 is disposed so as to be sandwiched between the positive electrode 17 and the negative electrode 18.

The above-described cell 10 is, for example, used as a lithium ion secondary cell. In such a case, the cell case packaging 1 is used as lithium ion secondary cell case packaging.

7-2. High-Alkali Solution Packaging and Package

Figure 3:
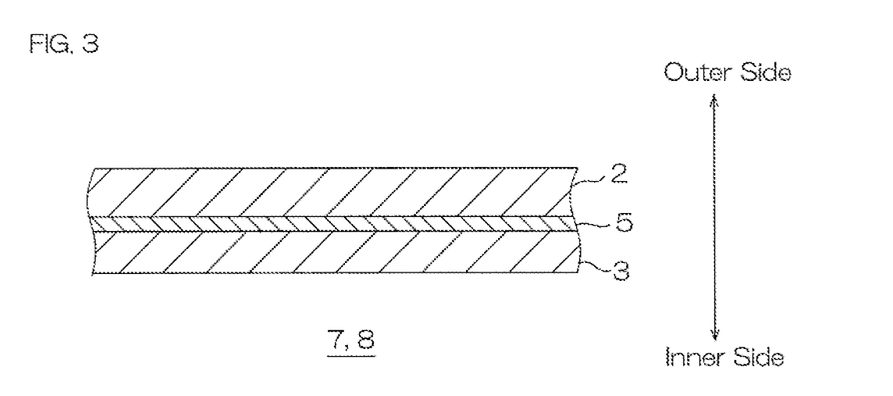
FIG. 3 shows a sectional view of one embodiment of high-alkali solution packaging or alcohol-containing solution packaging of the present invention.

Next, high-alkali solution packaging is described with reference to FIG. 3. In FIG. 3, the upper side of the paper surface is described as an outer side and the lower side of the paper surface is described as an inner side.

High-alkali solution packaging 7 includes the substrate 2, the inner-side layer 3 adhering to the inner side of the substrate 2, and the inner-side adhesive layer 5 interposed between the substrate 2 and the inner-side layer 3.

The substrate 2 is not particularly limited and is formed from, for example, a polyamide resin such as nylon, a polyester resin such as PET, a metal foil such as aluminum foil, and a barrier film such as transparent vapor deposition PET. When the substrate 2 is nylon, to improve the adhesive properties to the inner-side layer 3, preferably, the substrate 2 having the surface (the inner surface of the substrate 2 in contact with the inner-side adhesive layer 5, in particular) to which surface treatment by corona discharge, coating, or the like is applied is used. When the substrate 2 is used for the high-alkali solution packaging 7, corona treatment is preferably applied to the inner surface of the substrate 2. This is because the adhesive strength may be reduced in the case of easy adhesion by coating with the coating agent.

The inner-side layer 3 corresponds to the above-described adherend and is not particularly limited. To impart chemical resistance and heat-sealing properties to the high-alkali solution packaging 7, preferably, a thermoplastic polyolefin film such as unstretched polypropylene film and low-density linear polyethylene is used.

The inner-side adhesive layer 5 corresponds to the above-described adhesive layer.

The high-alkali solution packaging 7 has a thickness of, for example, 30 µm or more and 200 µm or less.

Next, a package including the above-described high-alkali solution packaging is described with reference to FIG. 4.

Figure 4:
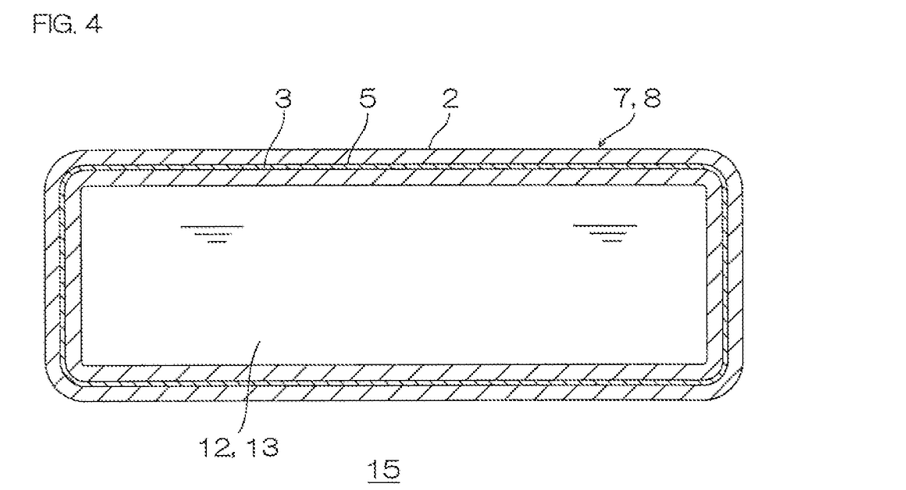
FIG. 4 shows a sectional view of one embodiment of a package of the present invention.

As shown in FIG. 4, a package 15 includes the high-alkali solution packaging 7 and a high-alkali solution 12 packaged in the high-alkali solution packaging 7.

The high-alkali solution packaging 7 is provided in a bag shape so that the high-alkali solution 12 to be described next is in contact with the inner surface of the inner-side layer 3 in the high-alkali solution packaging 7.

The high-alkali solution 12 is a solution having a pH of, for example, 9 or more, or preferably 10 or more, and, for example, 14 or less. Examples of the high-alkali solution include alkali detergents and hair treatment agents.

7-3. Alcohol-Containing Solution Packaging and Package

Next, alcohol-containing solution packaging is described with reference to FIG. 3.

Alcohol-containing solution packaging 8 includes the substrate 2, the inner-side layer 3 adhering to the inner side of the substrate 2, and the inner-side adhesive layer 5 interposed between the substrate 2 and the inner-side layer 3.

The substrate 2 is not particularly limited and is formed from, for example, a polyamide resin such as nylon, a polyester resin such as PET, a metal foil such as aluminum foil, and a barrier film such as transparent vapor deposition PET. When the substrate 2 is nylon, to improve the adhesive properties to the inner-side layer 3, preferably, the substrate 2 having the surface (the inner surface of the substrate 2 in contact with the inner-side adhesive layer 5, in particular) to which surface treatment by corona discharge, coating, or the like is applied is used. When the substrate 2 is used for the alcohol-containing solution packaging 8, corona treatment is preferably applied to the inner surface of the substrate 2. This is because the adhesive strength may be reduced in the case of easy adhesion by coating with the coating agent.

The inner-side layer 3 corresponds to the above-described adherend and is not particularly limited. To impart chemical resistance and heat-sealing properties to the alcohol-containing solution packaging 8, preferably, a thermoplastic polyolefin film such as unstretched polypropylene film and low-density linear polyethylene is used.

The inner-side adhesive layer 5 corresponds to the above-described adhesive layer.

The alcohol-containing solution packaging 8 has a thickness of, for example, 30 µm or more and 200 µm or less.

Next, a package including the alcohol-containing solution packaging is described with reference to FIG. 4.

As shown in FIG. 4, the package 15 includes the alcohol-containing solution packaging 8 and an alcohol-containing solution 13 packaged in the alcohol-containing solution packaging 8.

The alcohol-containing solution packaging 8 is provided in a bag shape so that the alcohol-containing solution 13 to be described next is in contact with the inner surface of the inner-side layer 3 in the alcohol-containing solution packaging 8.

Examples of the alcohol contained in the alcohol-containing solution 13 include methanol, ethanol, propanol, and ethylene glycol. The content ratio of the alcohol with respect to the alcohol-containing solution 13 is, for example, 3 mass % or more, or preferably 5 mass % or more, and, for example, 95 mass % or less, or preferably 80 mass % or less.

8. Effect of Embodiment

The coating agent containing the above-described composition has excellent strength of the coated film. The adhesive made of the above-described coating agent and the laminate including the adhesive layer formed of the adhesive have excellent durability and are capable of sufficiently suppressing a reduction in the adhesive strength.

Thus, the composition, as a composition having excellent reliability, can be preferably used for various usages such as coating usage including adhesive usage.

As shown in FIGS. 1 and 2, for example, in the cell case packaging 1 and the cell 10, the adhesive strength of the substrate 2 with the inner-side layer 3 and the electrolyte resistance are excellent.

To be specific, as shown in FIG. 1, the inner-side adhesive layer 5 in the cell case packaging 1 has excellent electrolyte resistance. That is, even when the cell case packaging 1 is used over a long period of time, among all, a reduction in the adhesive strength of the inner-side adhesive layer 5 can be effectively prevented. The cell case packaging 1 has excellent long-term reliability.

The above-described composition can be used, not only for the cell case packaging, but also as an adhesive for laminate having resistance to a highly polar solvent such as electrolytic solution and alkali resistance and having excellent adhesive strength between the film and the adhesive layer.

That is, as shown in FIGS. 3 and 4, in the high-alkali solution packaging 7 or the alcohol-containing solution packaging 8 and the package 15 including those, the adhesive strength of the substrate 2 with the inner-side layer 3 and the alkali resistance of the high-alkali solution packaging 7 or the alcohol resistance of the alcohol-containing solution packaging 8 are excellent.

To be specific, the inner-side adhesive layer 5 in the high-alkali solution packaging 7 or the alcohol-containing solution packaging 8 has excellent alkali resistance or excellent alcohol resistance. That is, even when the high-alkali solution packaging 7 or the alcohol-containing solution packaging 8 is used for the package 15 over a long period of time, among all, a reduction in the adhesive strength of the inner-side adhesive layer 5 can be effectively prevented. The high-alkali solution packaging 7 or the alcohol-containing solution packaging 8 and the package 15 including those have excellent long-term reliability.

In FIGS. 1 and 3, the inner-side adhesive layer 5 is directly provided (laminated) on the surface (one surface) of the substrate 2. Alternatively, for example, though not shown in FIGS. 1 and 3, the inner-side adhesive layer 5 can be also provided on one side (inner side or outer side) of the substrate 2 via a printing layer by providing the printing layer or the like on one side (inner side or outer side) of the substrate 2.

EXAMPLES

Values in Examples and the like shown in the following can be replaced with the values (that is, the upper limit value or the lower limit value) described in the above-described embodiment.

1. Properties of Compound

The properties and the like of each of the compounds were evaluated in accordance with the following.

[Content Ratio of Structural Unit Derived from Propylene, Ethylene, and 1-Butene]

The content ratio of the structural unit derived from each of the propylene, the ethylene, and the 1-butene was obtained using $^{13}$C-NMR.

[Melting Point (Tm), Heat of Fusion (ΔH)]

The melting point (Tm) and the heat of fusion (ΔH) were obtained using a differential scanning calorimeter (manufactured by TA Instruments. Japan; DSC-Q1000).

To be specific, the melting point (Tm) and the heat of fusion (ΔH) were obtained in accordance with JIS K 7122 with a differential scanning calorimeter from a thermogram at the time of the second heating in a process, in the process, the temperature was first increased from 30° ° C. to 180° C. at 10° C./min (the first heating) and then, the temperature was retained for three minutes and next, the temperature was decreased until 0° C. at 10° C./min, then, the temperature was retained for three minutes, and thereafter, the temperature was again increased to 150° C. at 10° C./min (the second heating).

[Kinetic Viscosity at 40° C.]

The kinetic viscosity at 40° C. was measured based on ASTM D 445.

[Weight Average Molecular Weight (Mw) and Molecular Weight Distribution (Mw/Mn)]

The weight average molecular weight (Mw) and the molecular weight distribution (degree of dispersion) (Mw/Mn) were measured using gel permeation chromatography (manufactured by Shimadzu Corporation; LC-10 series) under the following conditions.

Detector: manufactured by Shimadzu Corporation; C-R4A

Column: TSKG 6000H-TSKG 4000H-TSKG 3000H-TSKG 2000H (manufactured by TOSOH CORPORATION)

Moving layer: tetrahydrofuran

Temperature: 40° C.

Flow rate: 0.8 mL/min

The average molecular weight (Mw) and the molecular weight distribution (Mw/Mn) were calculated using a calibration curve produced by monodispersed standard polystyrene.

[Modified Amount of Maleic Anhydride]

The content ratio (modified amount) of the maleic anhydride was obtained by $^1$H-NMR measurement.

[Half Crystallization Time of Maleic Anhydride Modified Propylene/1-butene Copolymer]

About 5 mg of maleic anhydride modified propylene/1-butene copolymer filled an aluminum pan for exclusive use. By using a differential scanning calorimeter (manufactured by PerkinElmer Co., Ltd.; Diamond DSC), a DSC curve was analyzed. The DSC curve was obtained in the following manner: after the temperature was increased from 30° C. to 150° C. at 320° C./min, the temperature was retained at 150° C. for five minutes; next, the temperature was decreased until 50° C. at 320° C./min; and the temperature was retained. To be specific, the half crystallization time was obtained by calculating the total heat from the area between the DSC curve and the base line and defining the time reaching 50% of the total heat as a reference (t=0) at the time of reaching 50° C.

[Ratio of NCO/COOH]

The ratio of NCO/COOH was calculated by the following formula.

$$NCO/COOH=(W\times N/100/42)/(W'\times M/100/98.06\times 2)$$

W: mass of polyisocyanate

N: isocyanate group content of polyisocyanate

W': mass of modified polymer

M: content of structural unit derived from monomer (maleic anhydride) in modified polymer Synthesis of Polymer Production Example 1

Synthesis of Propylene/1-butene Copolymer (1)

Hexane (900 mL) and 90 g of 1-butene were charged into a 2 L-autoclave that was sufficiently replaced with nitrogen and 1 mmol of triisobutylaluminum was added thereto. After the temperature of the obtained mixture was increased to 70° C., propylene was supplied thereto and the total pressure was set to be 7 kg/cm$^2$G. Then, 0.30 mmol of methylaminoxane and rac-dimethylsilylene-bis{1-(2-methyl-4-phenylindenyl)}zirconium dichloride that was 0.001 mmol when converted to Zr atoms were added to the obtained mixture and propylene was continuously supplied thereto to be polymerized for 30 minutes, while the total pressure thereof was retained at 7 kg/cm$^2$G. After the polymerization, the polymerized product was deaerated, the polymer was collected in a large amount of methanol, and then, drying under reduced pressure was performed at 110° C. for 12 hours. The melting point (Tm) of an obtained propylene/1-butene copolymer (1) was 78° C.; the heat of fusion (ΔH)

thereof was 29 J/g; the weight average molecular weight (Mw) thereof was 330,000; the molecular weight distribution (degree of dispersion) (Mw/Mn) thereof was 2; the content ratio of the structural unit derived from the propylene was 67 mol %; and the content ratio of the structural unit derived from the 1-butene was 33 mol %.

Production Example 2

Synthesis of Maleic Anhydride Modified Propylene/1-butene Copolymer (1)

The above-described propylene/1-butene copolymer (1) (3 kg) was added to 10 L of toluene; then, the temperature was increased to 145° C. under a nitrogen atmosphere; and the propylene/1-butene copolymer (1) was dissolved in the toluene. Furthermore, 382 g of maleic anhydride and 175 g of di-tert-butylperoxide were supplied to the system over four hours under stirring to be subsequently stirred at 145° C. for two hours. After cooling, a large amount of acetone was added thereto and a maleic anhydride modified propylene/1-butene copolymer (1) was precipitated to be then filtrated. After cleaning with acetone, vacuum drying was performed.

The melting point (Tm) of the obtained maleic anhydride modified propylene/1-butene copolymer (1) was 76° C.; the heat of fusion (ΔH) thereof was 29 J/g; the half crystallization time at 50° C. thereof was 946 seconds; the weight average molecular weight (Mw) thereof was 110,000; the molecular weight distribution (Mw/Mn) thereof was 2; and the modified amount of the maleic anhydride with respect to 100 parts by mass of the maleic anhydride modified propylene/1-butene copolymer (1) was 1 part by mass.

Production Example 3

Synthesis of Ethylene/Propylene Copolymer (1)

Hexane (1 L) that was dehydrated and refined was added to a continuous polymerization reactor with a stirring blade that was sufficiently replaced with nitrogen. After a hexane solution of ethylaluninum sesquichloride (Al $(C_2H_5)_{1.5}.Cl_{1.5}$) that was adjusted to be 96 mmol/L was continuously supplied for one hour at an amount of 500 mL/h, furthermore, as a catalyst, 500 mL/h of hexane solution of $VO(OC_2H_5)Cl_2$ that was adjusted to be 16 mmol/L and 500 mL/h of hexane were continuously supplied. Meanwhile, a polymerization solution was continuously extracted from the upper part of the polymerization reactor so that the polymerization solution in the polymerization reactor was always 1 L. Next, 27 L/h of ethylene gas, 26 L/h of propylene gas, and 100 L/h of hydrogen gas were supplied using a bubbling tube. The copolymerization reaction was performed at 35° C. by circulating coolant in a jacket provided at the outside of the polymerization reactor. After the obtained polymerization solution was decalcified with hydrochloric acid, a large amount of methanol was added to be deposited and then, drying under reduced pressure was performed at 130° C. for 24 hours. In this manner, an ethylene/propylene copolymer (1) was obtained.

The content ratio of the structural component derived from the ethylene in the obtained ethylene/propylene copolymer (1) was 56 mol %; the content ratio of the structural component derived from the propylene therein was 44 mol %; and the kinetic viscosity at 40° C. thereof was 37,500 cSt. The kinetic viscosity was measured in accordance with ASTM D 445. The weight average molecular weight (Mw) thereof was 14,000 and the molecular weight distribution (Mw/Mn) thereof was 1.9.

Production Example 4

Synthesis of Maleic Anhydride Modified Propylene/Ethylene Copolymer (1)

The propylene/ethylene copolymer (3 kg) having a propylene content of 67 mol % and a weight average molecular weight (Mw) of 330,000 was added to 10 L of toluene and nitrogen replacement in the system was performed for one hour.

The temperature of the system was increased to 145° C. and the propylene/ethylene copolymer was completely dissolved in the toluene. Thereafter, while continuing the stirring in the system, 382 g of maleic anhydride and 175 g of di-tert-butyl peroxide were supplied to the system over four hours from separate supply ports; furthermore, the stirring was continued at 145° C. for two hours as a post-reaction; and thereafter, the system was cooled to a room temperature.

A part of the reaction liquid after cooling was collected to be put into a large amount of acetone, so that a maleic anhydride modified propylene/ethylene copolymer having a crumb shape (chip shape) was precipitated.

The obtained precipitate was collected and repeatedly cleaned with acetone to be thereafter dried under vacuum at a normal temperature for two days and nights, so that a refined maleic anhydride modified propylene/ethylene copolymer (1) was obtained. The modified amount of the maleic anhydride with respect to 100 parts by mass of the maleic anhydride modified propylene/ethylene copolymer (1) was 5.3 mass %. The heat of fusion (ΔH) thereof was 1.6 J/g and the weight average molecular weight (Mw) thereof was 140,000.

Production Example 5

Synthesis of Propylene/1-butene Copolymer (2)

The synthesis was performed in the same manner as that in [Production Example 1: Synthesis of Propylene/1-butene Copolymer (1)], except that the charged amount of 1-butene was changed from 90 g to 75 g. The melting point (Tm) of an obtained propylene/1-butene copolymer (2) was 84° C.; the heat of fusion (ΔH) thereof was 32 J/g; the weight average molecular weight (Mw) thereof was 330,000; the molecular weight distribution (Mw/Mn) thereof was 2; the content ratio of the structural unit derived from the propylene was 78 mol %; and the content ratio of the structural unit derived from the 1-butene was 22 mol %.

Production Example 6

Synthesis of Maleic Anhydride Modified Propylene/1-butene Copolymer (2)

The synthesis was performed in the same manner as that in [Production Example 2:

Synthesis of Maleic Anhydride Modified Propylene/1-butene Copolymer (1)], except that the propylene/1-butene copolymer (2) in Production Example 5 was used instead of the propylene/1-butene copolymer (1) in Production Example 1. The melting point (Tm) of an obtained maleic anhydride modified propylene/1-butene copolymer (2) was 84° C.; the heat of fusion (ΔH) thereof was 32 J/g; the half crystallization time at 50° C. thereof was 276 seconds; the weight average molecular weight (Mw) thereof was 110,000; the molecular weight distribution (Mw/Mn) thereof was 2; and the modified amount of the maleic anhydride with respect to 100 parts by mass of the maleic anhydride modified propylene/1-butene copolymer (2) was 1 part by mass.

Preparation of Modified Olefin Polymer Varnish (1)

Preparation Example 1

Modified Olefin Polymer Varnish (1)

100 g of the maleic anhydride modified propylene/1-butene copolymer (1) produced in Production Example 2 was dissolved in 400 g of toluene, so that a modified olefin polymer varnish (1) was prepared.

Preparation Example 2

Modified Olefin Polymer Varnish (2)

80 g of the maleic anhydride modified propylene/1-butene copolymer (1) produced in Production Example 2 and 20 g of the ethylene/propylene copolymer (1) produced in Production Example 3 were dissolved in 400 g of toluene, so that a modified olefin polymer varnish (2) was prepared.

Preparation Example 3

Modified Olefin Polymer Varnish (3)

50 g of the maleic anhydride modified propylene/ethylene copolymer (1) produced in Production Example 4 was dissolved in 450 g of toluene, so that a modified olefin polymer varnish (3) was prepared.

Preparation Example 4

Preparation of Modified Olefin Polymer Varnish (4)

80 g of the maleic anhydride modified propylene/1-butene copolymer (2) produced in Production Example 6 and 20 g of the ethylene/propylene copolymer (1) produced in Production Example 3 were dissolved in 400 g of toluene, so that a modified olefin polymer varnish (4) was prepared.

Preliminary of Polyisocyanate

Preliminary Example 1

Preliminary of Biuret Modified Product of Hexamethylene Diisocyanate

A biuret modified product of hexamethylene diisocyanate ("TAKENATE D-165N", average number of functional group of three or more, isocyanate group content of 23.5%, manufactured by Mitsui Chemicals, Inc.) was prepared as polyisocyanate in Preliminary Example 1.

Preliminary Example 2

Preliminary of Trimer Modified Product

A trimmer modified product of hexamethylene diisocyanate ("TAKENATE D-170N", trimer, average number of functional group of three or more, isocyanate group content of 21.0%, manufactured by Mitsui Chemicals, Inc.) was prepared as polyisocyanate in Preliminary Example 2.

Fabrication of Composite Film (Al Foil/Adhesive Layer/PP Film Laminate)

Example 1

The non-volatile content of the modified olefin polymer varnish (1) in Preparation Example 1 and the biuret modified product in Preliminary Example 1 were mixed so as to have the ratio, based on mass, described in Table 1, so that an adhesive for laminate was prepared. Next, by using a bar coater, the adhesive for laminate was diluted with toluene to be then applied onto a glossy surface of an aluminum foil (untreated surface) having a thickness of 40 μm so as to have a basis weight of 3.3 g/m² (solid content) under a normal temperature, so that a solvent was volatilized. Thereafter, the applied surface of the adhesive for laminate in the aluminum foil was attached to a corona-treated surface of an unstretched polypropylene film (one corona-treated surface) having a thickness of 60 μm to be then aged at 60° C. for three days. In this manner, the adhesive for laminate cured and the aluminum foil adhered to the unstretched polypropylene film, so that a composite film was obtained as a laminate of the aluminum foil, the adhesive layer, and the unstretched polypropylene film.

Examples 2 to 7 and Comparative Examples 1 to 2

A composite film was obtained in the same manner as that in Example 1, except that components were mixed in accordance with the formulation shown in Table 1, thereby preparing an adhesive for laminate.

Fabrication and Evaluation of Laminate (Glass/Adhesive Layer/Aluminum Laminate)

Example 8

45 g of the modified olefin polymer varnish (4) in Prepared Example 4 and 1 g of the trimer modified product in Preliminary Example 2 were mixed, so that an adhesive varnish was prepared. Next, the prepared adhesive varnish was applied onto hard aluminum (thickness of 30 μm) to be dried at 200° C. for one minute, so that a coated film having a drying film thickness of 20 μm was obtained. The obtained hard aluminum having an adhesive film was compressively bonded to a glass adherend (manufactured by Testpiece Co., Ltd.; 25×50×2 mm) using a heat sealer (manufactured by TESTER SANGYO CO., LTD.; TP-701-B) under the conditions of 230° C., 0.3 MPa, and one second. The obtained test piece was retained for 30 minutes in an oven at 150° C. to be subjected to heat treatment.

In this manner, a laminate consisting of the hard aluminum, the adhesive layer, and the glass adherend was obtained.

Comparative Example 3

A laminate was produced in the same manner as that in Example 8 and subsequently, the peeling strength thereof was measured, except that the polyisocyanate in Preliminary Example 2 was not mixed.

Evaluation

Examples 1 to 7 and Comparative Examples 1 and 2

(1) Adhesive Strength (Ordinary Strength)

Each of the composite films in Examples 1 to 7 and Comparative Examples 1 and 2 was cut into a size having a length of 150 mm and a width of 15 mm, so that a test piece was fabricated. The test piece was subjected to a T-type peeling test at a crosshead rate of 300 mm/min using a universal tensile measuring device, so that the adhesive strength of the composite film was measured. The results are shown in Table 1.

(2) Electrolyte Resistance Test

The composite film was immersed in a mixed solvent (electrolytic solution) containing ethylene carbonate, diethyl carbonate, and dimethyl carbonate at a mass ratio of 1/1/1 at 85° C. for 168 hours. After the immersion, the composite film was taken out and the mixed solvent was removed. Thereafter, the resulting composite film was immediately subjected to a T-type peeling test at a crosshead rate of 300 mm/min using a universal tensile measuring device, so that the adhesive strength of the composite film after immersion was measured. The results are shown in Table 1.

Example 8 and Comparative Example 3

(3) Adhesive Strength (Strength after Heating)

Each of the laminates in Example 8 and Comparative Example 3 was stored for two days in a thermo-hygrostat at 60° C. having relative humidity of 90%. After storing, the laminate was taken out from the thermo-hygrostat to be then allowed to stand still for one night at a room temperature. Thereafter, a cut in a strip shape having a width of 1 cm was applied to the resulting laminate, so that a test piece was fabricated. The test piece was subjected to a 180-degree peeling test in which the hard aluminum was peeled from the glass adherend at 180 degrees using an autograph (manufactured by Shimadzu Corporation, AGS-500B) under the conditions of 100 mm/min, so that the adhesive strength thereof was measured. The results are shown in Table 2.

In Table 1, values in components show parts by mass.

TABLE 2

|  | Ex. 8 | Comp. Ex. 3 |
|---|---|---|
| Adhesive Strength at 60° C. and 90% after two days [N/cm] | 20 | 1 |

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The adhesive is used for the laminate, the cell case packaging, the cell, the high-alkali solution packaging, the alcohol-containing solution packaging, and the package.

DESCRIPTION OF REFERENCE NUMERALS

1 Cell case packaging
2 Substrate
3 Inner-side layer
4 Outer-side layer
5 Inner-side adhesive layer
6 Outer-side adhesive layer
7 High-alkali solution packaging
8 Alcohol-containing solution packaging

The invention claimed is:
1. An adhesive comprising:
a modified olefin polymer (A) obtained by modifying a polymer of a C2 to C20 α-olefin having a structural unit derived from a C4 to C20 α-olefin, with a monomer having a functional group having active hydrogen and

TABLE 1

| | Polymer of C2 to C20 α-olefin | | | | | | | Strength after test at 65° C. for Seven Days |
|---|---|---|---|---|---|---|---|---|
| | Modified Olefin Polymer (A) Maleic Anhydride Modified | Synthetic Hydrocarbon | | Polyisocyanate | | | Adhesive | |
| | Propylene/ 1-Butene Copolymer | Oil (D) Ethylene/ Propylene Copolymer | Maleic Anhydride Modified Propylene/Ethylene Copolymer | Biuret Modified Product of 1,6-Hexamethylene Diisocyanate | Trimer Modified Product of 1,6-Hexamethylene Diisocyanate | NCO/COOH | Strength Ordinary Strength [N/15 mm] | (Immediately After) Electrolyte Resistance Test [N/15 mm] |
| Ex. 1 | 10 | — | — | 1 | — | 2.7 | 6.5 | 4 |
| Ex. 2 | 10 | — | — | — | 1 | 2.5 | 6.3 | 3.9 |
| Ex. 3 | 8 | 2 | — | 1 | — | 3.4 | 6.8 | 3.6 |
| Ex. 4 | 48 | 12 | — | 1 | — | 0.6 | 8.3 | 6.1 |
| Ex. 5 | 1.6 | 0.4 | — | 1 | — | 17.2 | 5.8 | 3.4 |
| Ex. 6 | 1.2 | — | — | 1 | — | 22.9 | 6.9 | 2.9 |
| Ex. 7 | 3 | — | — | — | 1 | 8.2 | 6.9 | 3.6 |
| Comp. Ex. 1 | 10 | — | — | — | — | 0.0 | 0.6 | Lamination Peeling* |
| Comp. Ex. 2 | — | — | 0.8 | 1 | — | 6.5 | 3.2 | 1.1 |

*Cohesive failure (failure at the inside of the adhesive layer)

having a heat of fusion measured in accordance with JIS K7122 of 0 J/g or more and 50 J/g or less;

a polyisocyanate (B); and a synthetic hydrocarbon oil (D), wherein a melting point of the modified olefin polymer (A) is 40° C. or more and 100° C. or less, the synthetic hydrocarbon oil (D) is an ethylenic copolymer having a structural unit derived from ethylene and a structural unit derived from a C3 to C20 α-olefin, the modified olefin polymer (A) has an acid value of 10 mgKOH/g or less, and the synthetic hydrocarbon oil (D) has a kinetic viscosity at 40° C. of 5,000 cSt or more and 300,000 cSt or less.

2. The adhesive according to claim 1, wherein the polymer has a structural unit derived from propylene.

3. The adhesive according to claim 2, wherein the content ratio of the structural unit derived from the propylene with respect to 100 mol % of the structural unit derived from the C2 to C20 α-olefin is 40 mol % or more and 95 mol % or less.

4. The adhesive according to claim 2, wherein in the polymer, the entire structural unit, excluding the structural unit derived from the propylene, is the structural unit derived from the C4 to C20 α-olefin.

5. The adhesive according to claim 4, wherein the C4 to C20 α-olefin is 1-butene.

6. The adhesive according to claim 1, wherein the content ratio of the monomer with respect to 100 parts by mass of the modified olefin polymer (A) is 0.1 parts by mass or more and 15 parts by mass or less.

7. The adhesive according to claim 1, wherein the functional group is a carboxyl group and/or an anhydride group.

8. Cell case packaging comprising:

a substrate, an inner-side layer adhering to the inner side of the substrate, an outer-side layer adhering to the outer side of the substrate, an inner-side adhesive layer interposed between the substrate and the inner-side layer and including a cured material of the adhesive described in claim 1, and an outer-side adhesive layer interposed between the substrate and the outer-side layer.

9. A cell comprising:

the cell case packaging described in claim 8 and an electrolytic solution packaged in the cell case packaging, wherein at least a part of the inner-side layer of the cell case packaging is in contact with the electrolytic solution.

10. High-alkali solution packaging comprising:

a substrate, an inner-side layer adhering to the inner side of the substrate, and an inner-side adhesive layer interposed between the substrate and the inner-side layer and including a cured material of the adhesive described in claim 1.

11. A package comprising:

the high-alkali solution packaging described in claim 10 and a solution of pH 9 or more packaged in the high-alkali solution packaging.

12. Alcohol-containing solution packaging comprising:

a substrate, an inner-side layer adhering to the inner side of the substrate, and an inner-side adhesive layer interposed between the substrate and the inner-side layer and including a cured material of the adhesive described in claim 1.

13. A package comprising:

the alcohol-containing solution packaging described in claim 12 and an alcohol-containing solution packaged in the alcohol-containing solution packaging.

14. A laminate comprising:

a substrate and an adhesive layer provided at one side of the substrate and formed of an adhesive, wherein the adhesive layer is made of a coating agent including a composition including a modified olefin polymer (A) obtained by modifying a polymer of a C2 to C20 α-olefin having a structural unit derived from a C4 to C20 α-olefin, with a monomer having a functional group having active hydrogen and having a heat of fusion measured in accordance with JIS K7122 of 0 J/g or more and 50 J/g or less;

a polyisocyanate (B); and a synthetic hydrocarbon oil (D), wherein a melting point of the modified olefin polymer (A) is 40° C. or more and 100° C. or less, the synthetic hydrocarbon oil (D) is an ethylenic copolymer having a structural unit derived from ethylene and a structural unit derived from a C3 to C20 α-olefin, the modified olefin polymer (A) has an acid value of 10 mgKOH/g or less, and the synthetic hydrocarbon oil (D) has a kinetic viscosity at 40° C. of 5,000 cSt or more and 300,000 cSt or less.

15. The laminate according to claim 14, wherein the adhesive layer is directly laminated on one surface of the substrate.

16. The laminate according to claim 14 further comprising:

an adherend adhering to one side of the substrate via the adhesive layer.

* * * * *